United States Patent
Okada

(12) 
(10) Patent No.: US 10,291,961 B2
(45) Date of Patent: May 14, 2019

(54) COMMUNICATION APPARATUS, IMAGE DISPLAY APPARATUS, AND STORAGE MEDIUM

(71) Applicant: CANON KABUSHIKI KAISHA, Tokyo (JP)

(72) Inventor: Yoshiyuki Okada, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/370,423

(22) Filed: Dec. 6, 2016

(65) Prior Publication Data

US 2017/0171619 A1    Jun. 15, 2017

(30) Foreign Application Priority Data

Dec. 9, 2015   (JP) ................ 2015-239846

(51) Int. Cl.
*H04N 21/462*    (2011.01)
*H04N 21/426*    (2011.01)
(Continued)

(52) U.S. Cl.
CPC ....... *H04N 21/4622* (2013.01); *H04N 21/426* (2013.01); *H04N 21/42607* (2013.01); *H04N 21/4383* (2013.01); *H04N 21/61* (2013.01)

(58) Field of Classification Search
CPC ............. H04N 21/4222; H04N 21/426; H04N 21/42607; H04N 21/4383; H04N 21/61
(Continued)

(56) References Cited

U.S. PATENT DOCUMENTS 6,871,244 B1 * 3/2005 Cahill ................. G06F 13/4068
710/105
7,182,646 B1 * 2/2007 Chou ............... G06K 19/07732
439/660

(Continued)

FOREIGN PATENT DOCUMENTS

CN    101666958 A    3/2010
EP    2955873 A1    12/2015
(Continued)

OTHER PUBLICATIONS

Extended European Search Report issued in European Appln. No. 16002602.7 dated Aug. 10, 2017.
(Continued)

*Primary Examiner* — Paul R. Myers
(74) *Attorney, Agent, or Firm* — Rossi, Kimms & McDowell LLP

(57) ABSTRACT

A communication apparatus includes a first communicator configured to receive signals of a plurality of standards containing a first network signal as a transmitted and received signal for a network, a second communicator configured to receive a second network signal as a transmitted and received signal for the network, a selector configured to select one of the first and second network signals, and a controller configured to control the first and second communicators and the selector. The first communicator includes a first confirmer configured to confirm a reception of the first network signal among the signals of the plurality of standards for the first communicator, and a first operation mode setter configured to set an operation mode to the first communicator.

16 Claims, 7 Drawing Sheets

(51) Int. Cl.
*H04N 21/438* (2011.01)
*H04N 21/61* (2011.01)

(58) Field of Classification Search
USPC .......................................... 710/38, 301–302
See application file for complete search history.

(56) References Cited

U.S. PATENT DOCUMENTS

| | | | | |
|---|---|---|---|---|
| 7,254,650 | B2* | 8/2007 | Lin | G06K 7/0008 |
| | | | | 710/10 |
| 7,607,579 | B2* | 10/2009 | Yoshida | G06F 3/0611 |
| | | | | 235/375 |
| 7,701,452 | B2 | 4/2010 | Fujiwara | |
| 7,836,236 | B2* | 11/2010 | Chou | G06F 13/385 |
| | | | | 710/11 |
| 8,359,416 | B1* | 1/2013 | Zhang | G06F 13/4022 |
| | | | | 710/313 |
| 8,838,869 | B1* | 9/2014 | Puranik | G06F 13/387 |
| | | | | 710/312 |
| 8,964,125 | B2 | 2/2015 | Furihata et al. | |
| 2003/0229748 | A1* | 12/2003 | Brewer | G06F 13/385 |
| | | | | 710/305 |
| 2008/0292007 | A1 | 11/2008 | Lida et al. | |
| 2011/0206035 | A1 | 8/2011 | Lee et al. | |
| 2014/0092312 | A1 | 4/2014 | Furihata et al. | |
| 2015/0358363 | A1 | 12/2015 | Park et al. | |

FOREIGN PATENT DOCUMENTS

| | | |
|---|---|---|
| JP | 2006285167 A | 10/2006 |
| JP | 2014071436 A | 4/2014 |

OTHER PUBLICATIONS

Partial European Search Report issued in European Patent Application No. 16002602.7 dated Mar. 29, 2017.
Office Action issued in Chinese Appln. No. 201611106026X dated on Aug. 21, 2018. English Translation provided.

* cited by examiner

|  | ETHERNET | HDBT (CONTAINING LAN) | HDBT (NOT CONTAINING LAN) |
|---|---|---|---|
| ETHERNET | ○ | × | ○ |
| HDBT | △ | ○ | △ |

○ : LAN CONNECTION OR MODE WITH LAN
△ : MODE WITHOUT LAN
× : STOP

FIG. 5

|  | HDBT-1 (CONTAINING LAN) | HDBT-1 (NOT CONTAINING LAN) | HDBT-2 (CONTAINING LAN) | HDBT-2 (NOT CONTAINING LAN) |
|---|---|---|---|---|
| HDBT-1 | ○ | △ | △ | ○ |
| HDBT-2 | △ | ○ | ○ | △ |

○: LAN CONNECTION OR MODE WITH LAN
△: MODE WITHOUT LAN

FIG. 7

COMMUNICATION APPARATUS, IMAGE DISPLAY APPARATUS, AND STORAGE MEDIUM

BACKGROUND OF THE INVENTION

Field of the Invention

The present invention relates to a communication apparatus connectable to a network and an image display apparatus having the same.

Description of the Related Art

Direct view type and projection type image display apparatuses configured to display an image on a display unit or to project an image on a screen, based on a signal input from a source device, such as a video device and a computer, are demanded to accept an input signal from a variety of source devices. For example, these image display apparatuses need to accept an input of a LAN signal through the Ethernet®, an HDMI signal from the source device, such as a DVD player and a Blu-ray Disc player, a DVI signal from the computer, and a USB signal from a USB unit. Herein, HDMI stands for High-Definition Multimedia Interface, DVI stands for Digital Visual Interface, and USB stands for Universal Serial Bus.

An image display apparatus disclosed in Japanese Patent Laid-Open No. ("JP") 2006-285167 switches a plurality of input terminals through an input selector, confirms whether a video signal is connected (input), and displays a disconnection of the video signal if the video signal is disconnected or a connected video signal if the video signal is connected. When a plurality of video signals are connected, a connection status of the video signal is displayed so as to enable a user to select a video signal to be connected or so as to automatically select a video signal.

JP 2014-71436 discloses an image display apparatus connectable, as a LAN input signal, with a signal conforming to the Ethernet standard and a signal conforming to the HDBaseT standard.

However, the image display apparatus disclosed in JP 2006-285167 cannot handle a change of the connection status once confirming a signal connection status in the input terminal and setting the signal to be connected in the initial state when the power is projected. More specifically, when the set signal is disconnected or when a signal is newly connected to the input terminal, this image display apparatus cannot properly connect the input signal by monitoring the connection state, displaying the connection status, and automatically reconnecting the signal.

The image display apparatus displaced in JP 2014-71436 previously sets one of the two types of signals, Ethernet and HDBaseT signals connectable to the LAN, powers off a communication circuit for the non-set input signal, powers on a communication circuit for the set input signal, and waits for the set signal through the input terminal. Since the Ethernet and HDBaseT use LAN cables having the same shaped connector, both LAN cables may be erroneously inserted. However, even when the LAN cable is erroneously inserted into the non-set input terminal, no warning is displayed and a user cannot recognize the apparatus state and the signal connection status at the input terminal.

The HDBaseT operation mode includes a LAN mode and a non-LAN mode, and when the non-LAN operation mode is set, the LAN connection is available by the Ethernet. However, JP 2014-71436 selects only one of the HDBaseT and Ethernet input signals, and is unlikely to use the LAN connection depending on the signal connection status and the operation mode.

SUMMARY OF THE INVENTION

The present invention provides a communication apparatus including a plurality of communication circuits connectable to a network and an image display apparatus having the same, which can set a proper operation mode according to signal connections to the plurality of communication circuits.

A communication apparatus according to the present invention includes a first communicator configured to receive signals of a plurality of standards containing a first network signal as a transmitted and received signal for a network, a second communicator configured to receive a second network signal as a transmitted and received signal for the network, a selector configured to select one of the first and second network signals, and a controller configured to control the first and second communicators and the selector. The first communicator includes a first confirmer configured to confirm a reception of the first network signal among the signals of the plurality of standards for the first communicator, and a first operation mode setter configured to set an operation mode to the first communicator. The second communication includes a second confirmer configured to confirm a reception of the second network signal for the second communicator, and a second operation mode setter configured to set an operation mode to the second communicator. The controller makes the selector select the one of the network signals in accordance with a confirmation result from the first or second confirmer and controls operation modes for the first and second communicators set by the first and second operation mode setters.

Further features of the present invention will become apparent from the following description of exemplary embodiments with reference to the attached drawings.

BRIEF DESCRIPTION OF THE DRAWINGS

FIG. 5 is a table illustrating an operation mode according to the second embodiment.

FIG. 7 is a table illustrating an operation mode according to the third embodiment.

DESCRIPTION OF THE EMBODIMENTS

Referring now to the accompanying drawings, a description will be given of embodiments according to the present invention.

First Embodiment

Figure 1:
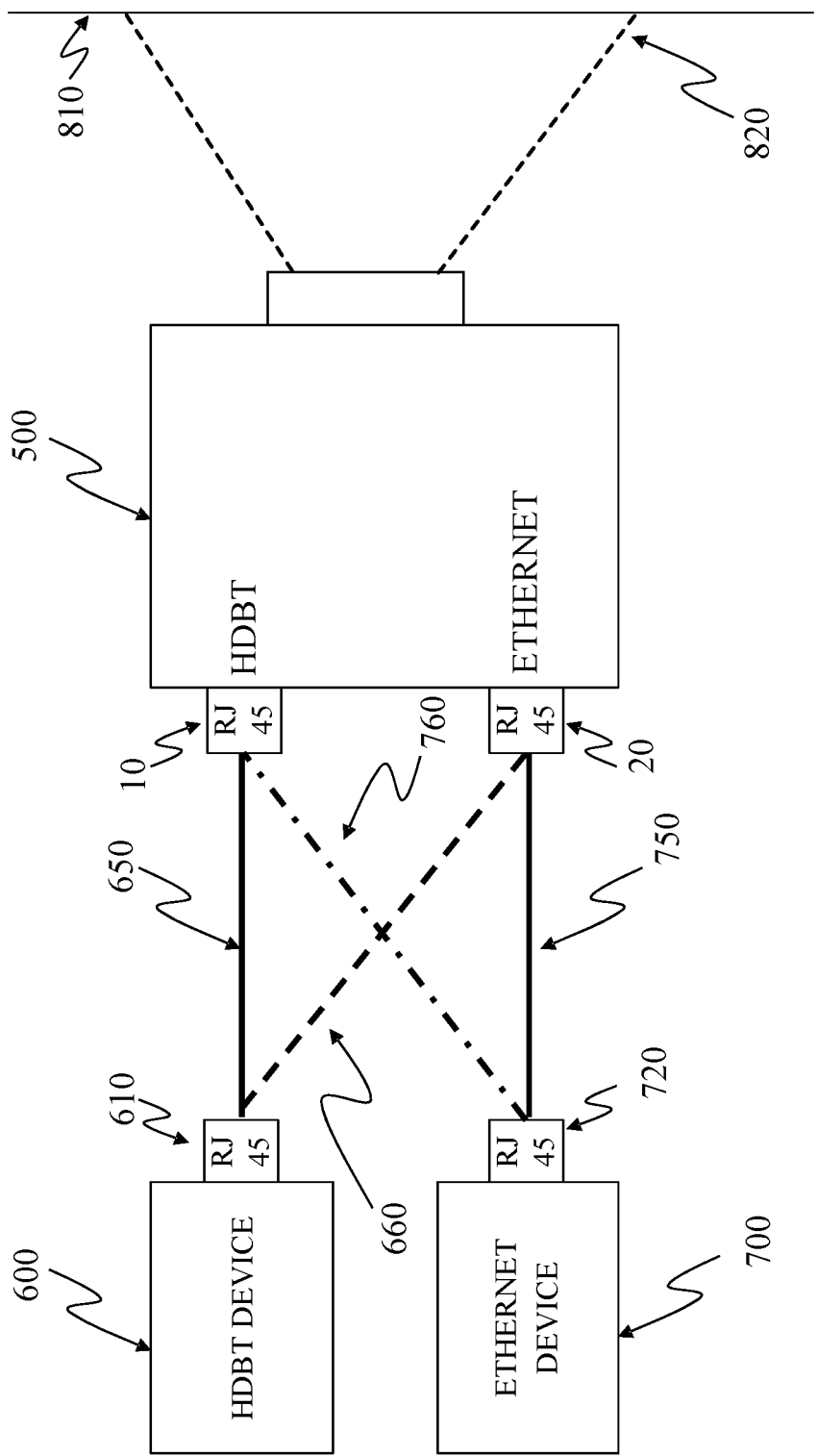
FIG. 1 is a block diagram of a connection example between a projector including a communication apparatus and a data transmitter according to a first embodiment of the present invention.

FIG. 1 illustrates a connection example among a projector 500 as an image display apparatus (image projection apparatus) including a communication apparatus according to a first embodiment of the present invention and data transmitters 600 and 700. In this connection example, the projector 500 includes RJ 45 connectors 10 and 20, and the HDBaseT device 600 and the Ethernet device 700 are connected to the RJ 45 connectors 10 and 20 via LAN cables 650 and 750. The projector 500 displays (projects) each received data signal input from the data transmitters 600 and 700 as a projected image 820 on a target plane 810.

A description will now be given of the projector connected to the HDBaseT device and the Ethernet device according to this embodiment. However, the projector may be connected to a DVD player configured to output an HDMI signal, a video source device, such as a disc player, a computer configured to output a DVI signal and a DisplayPort signal, and a USB device configured to output a USB signal. In FIG. 1 and other figures, HDBT stands for HDBaseT.

A RJ 45 connector is an 8-pin connector for the LAN cable. Ethernet is a network standard used for LAN, etc., and 10 BASE-T having 10 Mbps, 100 BASE-TX having 100 Mbps, 1000 BASE-T having 1 Gps are known. For example, each of 10 BASE-T and 100 BASE-TX is a 4-wire type, and 1000 BASE-TX is an 8-wire type. When the transmitter and the receiver have different Ethernet standards from each other, the auto-negotiation is performed when they are connected to each other, so as to automatically select a communicatable standard between them and to start the communication.

HDBaseT is a communication standard decided by "The HDBaseT Alliance," and use an 8-wire type with the LAN cable having the RJ45 connector. The HDBaseT can apply an independent protocol to transmit and receive a combination of five types of signals, such as the 100 BASE-T as the Ethernet standard, the HDMI signal, an acoustic signal, the device control signal, and the power. In other words, the HDBaseT corresponds to signals of a plurality of standards.

Thus, HDBaseT and Ethernet use the LAN cables having the same connectors, and thus the LAN cable may be erroneously connected (misconnected) to an unintentional device. For example, in FIG. 1, one end of the LAN cable illustrated by a broken line 660 is connected to the RJ45 connector 610 in the HDBaseT device 600, and the other end thereof is connected to the RJ 45 connector 20 for the Ethernet. One end of the LAN cable illustrated by an alternate long and short dash line 760 is connected to an RJ 45 connector 720 in the Ethernet device 700, and the other end thereof is connected to the RJ 45 connector 10 for the HDBaseT. This misconnection (improper connection) is caused by the same shaped connector of the HDBaseT and Ethernet connectors.

Figure 2:
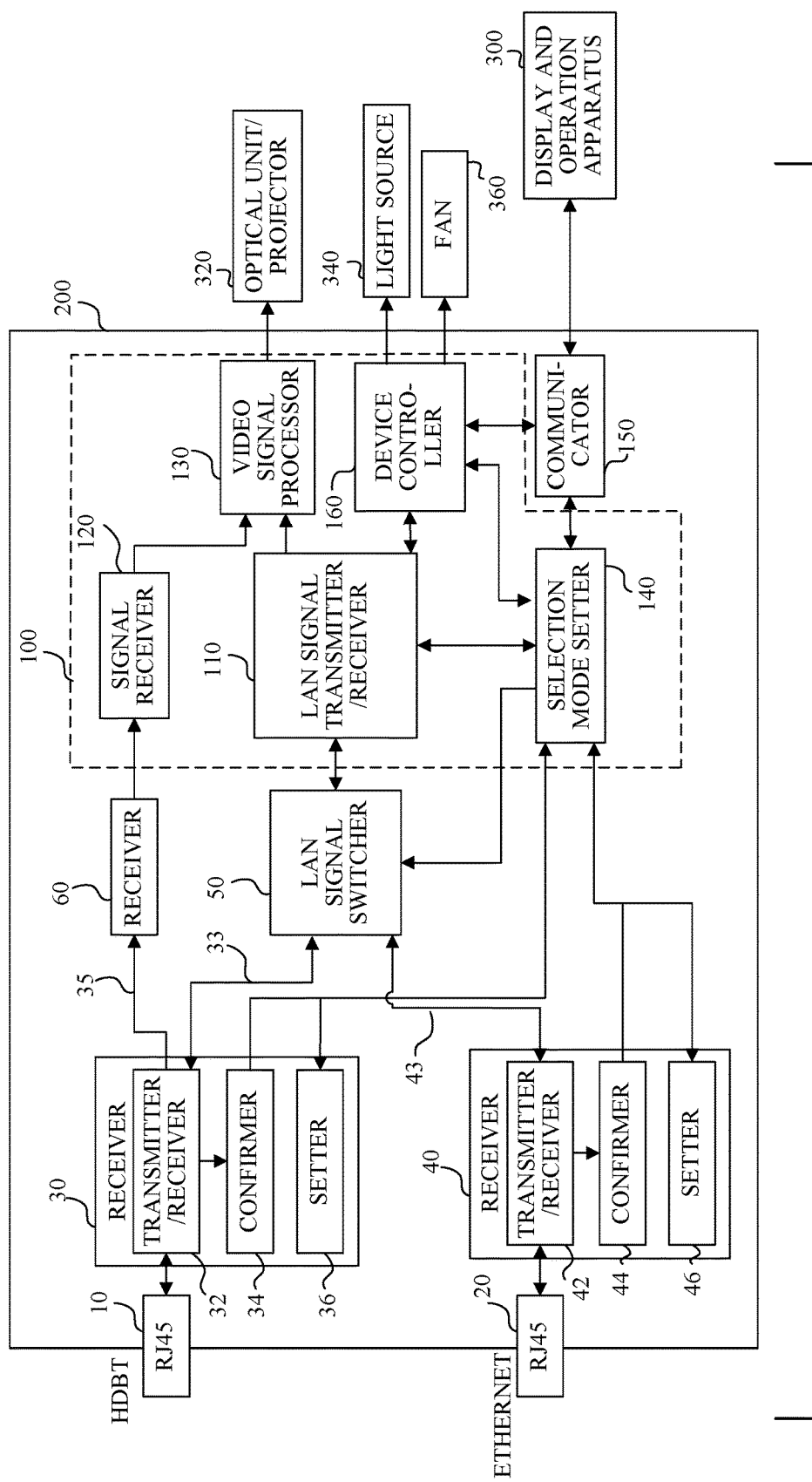
FIG. 2 is a block diagram illustrating a configuration of the projector.

FIG. 2 illustrates a configuration of the projector 500. The projector 500 includes a signal processor 200 including a communication apparatus, an optical unit/projector 320, a light source 340, and a cooling fan 360. The projector 500 is connected to a display and operation apparatus 300 (that serves as a display unit and an operation unit) as an external apparatus.

The RJ 45 connectors 10 and 20 are connectors for the HDBaseT and Ethernet.

The receiver (first communicator) 30 is an HDBaseT receiver that sends and receives an HDBaseT signal. The receiver 30 includes a transmitter/receiver 32 configured to transmit and receive data of the standards based on 100 BASE-TX, HDMI, and the like, a confirmer (first confirmer) 34 configured to confirm the receptions of the signals of a plurality of standards, and a setter (first operation mode setter) 36 configured to set an operation mode for the signals of the plurality of standards. The transmitter/receiver 32 includes a network transmitted and received signal (first network signal) 33 for the 100 BASE-TX, an HDMI signal 35, and another unillustrated communication signal. The operations of the confirmer 34 and the setter 36 will be described later. In the following description, the transmitter/receiver 32, the confirmer 34, and the setter 36 in the receiver 30 and the operation mode are HDBaseT transmitter/receiver 32, confirmer 34, and setter 36, and operation mode.

The network transmitted and received signal 33 is connected to a LAN signal switcher (selector) 50, and an HDMI signal 35 is input to a receiver 60. The network transmitted and received signal 33 is a signal called MII (Media Independent Interface) or RMII (Reduced Media Independent Interface). The network transmitted and received signal 33 is an interface signal between the transmitter 30 as the physical layer and a LAN signal transmitter/receiver 110 as a logic layer, selected by the LAN signal switcher 50, which will be described later, and connected to the LAN signal transmitter/receiver 110.

The HDMI signal 35 contains a high-speed difference signal and a low-speed control signal. After the receiver 60 decodes the HDMI signal 35, the HDMI signal 30 is converted into a video signal, a synchronizing signal, a clock signal and an audio signal, etc., and input to the signal receiver 120. The signals from the LAN signal transmitter 110 and the signal receiver 120 are input to a video signal processor 130 so as to receive a video signal process and a variety of corrections, etc., and input into the optical unit/projector 320 and projected as a projected image.

A device controller 160 controls the light source 340 necessary to project the image, and a cooling fan 360 configured to cool the inside of the projector 500, and monitors a sequence control and abnormality when the projector 500 starts and ends, controlling the operation of the projector.

The receiver (second communicator) 40 is an Ethernet receiver configured to transmit and receive an Ethernet signal. The receiver 40 includes a transmitter/receiver 42 configured to transmit and receive a data signal based on the standard, such as 10 BASE-T, 100 BASE-TX, and 100 BASE-T, a confirmer (second confirmer) 44 configured to confirm a connection status with the network through the Ethernet, and a setter (second operation mode setter) 46 configured to set an operation mode to the Ethernet. The operations of the confirmer 44 and the setter 46 will be described later. In the following description, the transmitter/receiver 42, the confirmer 44, and the setter 46 and the operation mode of the receiver 40 will be referred to as the Ethernet transmitter/receiver 42, the Ethernet confirmer 44, the Ethernet setter 46 and the Ethernet operation mode.

The signal from the transmitter/receiver 42 is a network transmitted and received signal (second network signal) 43, and connected to the LAN signal switcher 50. The network transmitted and received signal 43 is MII or RMII for the 10 BASE-T or 100 BASE-TX. In case of 1000 BASE-T, the network transmitted and received signal 43 is a signal of GMII (Gigabit Media Independent Interface) or RGMII (Reduced Gigabit Media Independent Interface). The network transmitted and received signal 43 is an interface signal between the receiver 40 as the physical layer and the LAN signal transmitter/receiver 110, selected by the LAN signal switcher 50, and connected to the LAN signal transmitter/receiver 110.

The signal from the LAN signal transmitter/receiver 110 is input to the video signal processor 130, the device controller 160, and the selection mode setter 140. Thereby, the projector is set and the projector state can be confirmed through the Ethernet, and the projected image corresponding to the data signal transmitted to the projector can be projected.

Both HDBaseT and Ethernet can be connected to the network based on the Ethernet standard. The processing at the LAN signal transmitter/receiver 110 corresponds to MII, RMII, GMII or RGMII for one channel. Thus, the LAN signal switcher 50 selects one of the network transmitted and received signal 33 from the HDBaseT and the network transmitted and received signal 43 from the Ethernet, and connects it to the LAN signal transmitter/receiver 110.

The selection mode setter (controller) 140 determines the signal selected by the LAN switcher 50 (one of the network signals) in accordance with signals (or confirmation results) from the HDBaseT confirmer 34 and the Ethernet confirmer 44. In addition, the selection mode setter 140 controls the operation modes set by the HDBaseT and Ethernet setters 36 and 46 in accordance with the signals (confirmation results) from the HDBaseT and Ethernet confirmers 34 and 44. Moreover, the selection mode 140 switches the interface specification in the LAN signal transmitter/receiver 110 among the MII, RMII, GMII and RGMII in accordance with the selected signal, such as the network transmitted and received signal 33 or 43.

When the interface specification in the LAN signal transmitter/reception 110 is switched, the protected image may be disturbed. In this case, the image signal input to the optical image/projector 320 may be switched to a sample pattern, and the sample pattern may be projected. The sample pattern may be a black pattern or another colored pattern, or an image, such as a predetermined pattern or wallpaper. In switching the interface specification, the LAN signal transmitter/receiver 110 may be reset, or only the peripheral circuit of the LAN signal transmitter/receiver 110 may be powered off/on.

In the signal processor 200 having this function, each function may include a discrete component and an integrated device, such as ASIC and FPGA may constitute part enclosed by a broken line 100.

The communicator (third communicator) 150 reads the operation state, the abnormality, etc. of the projector 500 from the device controller 160, and sends this information to the display and operation apparatus 300 so as to display and inform the user of the operation status, the abnormality content, warning, etc. of the projector 500. When the user manipulates the display and operation apparatus 300 for the setting and operation of the projector 500, the communicator 150 sends the information to the device controller 160 for the setting and operation of the projector 500 in accordance with the user manipulation.

The communicator 150 sends information of the selection mode set by the selection mode setter 140, which will be described later, to the display and operation apparatus 300 so as to display the information. When the user operates the display and operation apparatus 300 so as to change the setting of the selection mode, the setting of the selection mode setter 140 is changed through the communicator 150.

The communicator 150 may provide a short-distance wireless system, an infrared communication, etc. The short-distance wireless system may use a low-power wireless system, such as the Bluetooth and the BLE (Bluetooth Low Energy). The display and operation apparatus 300 may include a mobile terminal equipment, such as a tablet terminal. Even when the projector 500 is not operated, the state of the projector 500 can be confirmed or the projector 500 can be operated with an extremely low power, by using these low-power wireless system and the mobile device.

The communication apparatus includes the RJ 45 connectors 10 and 20, the receivers 30 and 40, the LAN signal switcher 50, the LAN signal transmitter/receiver 110, the selection mode setter 140, and the communicator 150.

Figure 3:
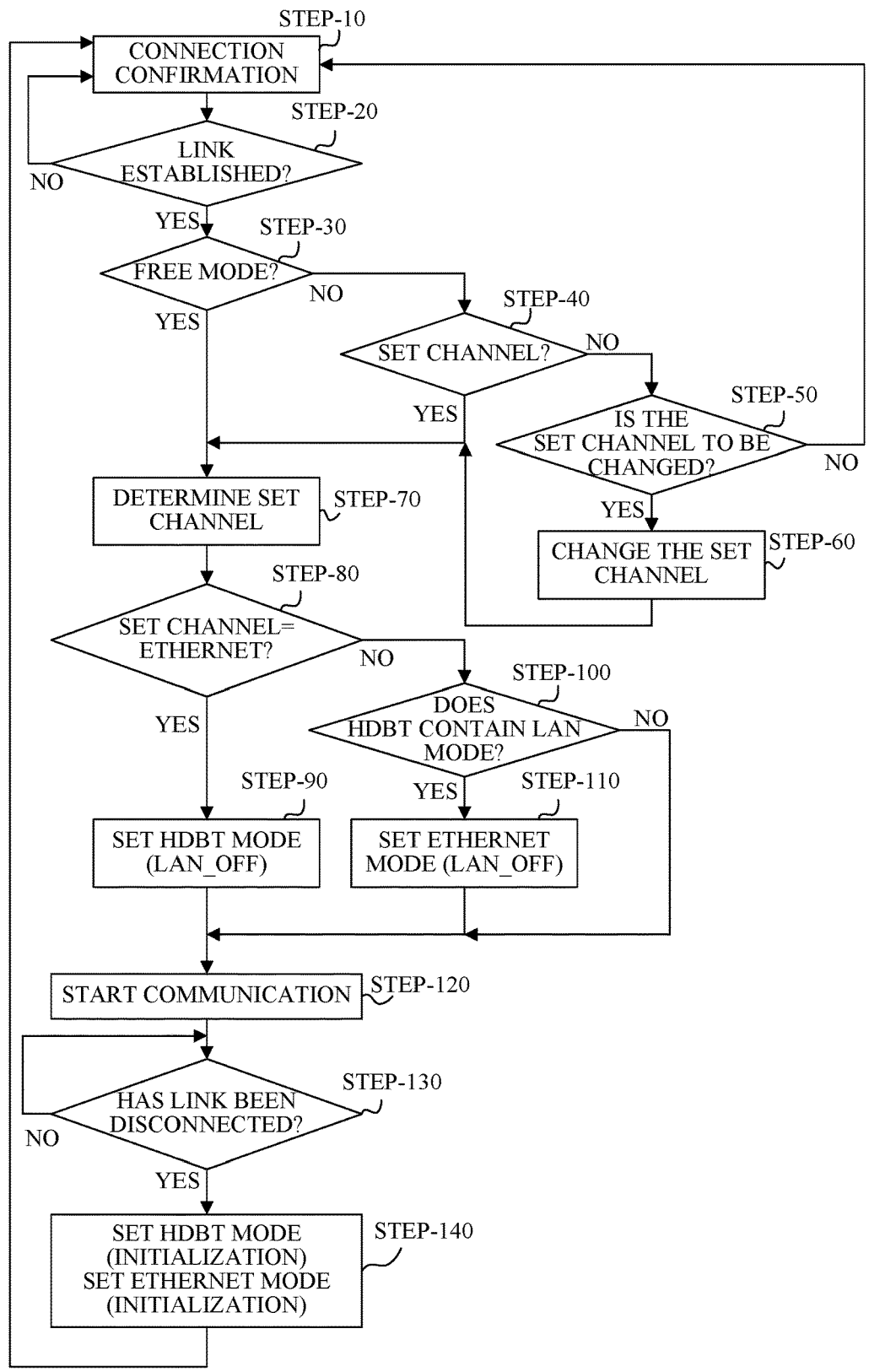
FIG. 3 is a flowchart for explaining processing according to the first embodiment.

FIG. 3 illustrates a flowchart for explaining processing (operation) performed by the selection mode setter 140. Herein, a description will be given of processing where at least one of the HDBaseT and the Ethernet is connected to the projector 500 via the LAN cable. The selection mode setter 140 that includes the computer or part of the computer may execute this processing in accordance with a communication control program as a computer program.

Initially, in Step-10, the selection mode setter 140 confirms a communication connection based on the signal from the HDBaseT confirmer 34 and the signal from the Ethernet confirmer 44.

Next, in Step-20, when the communication connection is confirmed or the link is established, the selection mode setter 140 confirms whether the selection mode has been set to the free mode (first selection mode) in Step-30. The free mode is a mode in which the selection mode setter 140 does not select a predetermined channel in setting a channel to be used (set channel) among the HDBaseT and the Ethernet, but selects one of the HDBaseT and Ethernet channels for which the link has previously been established. When the selection mode is a free mode, the selection mode setter 140 moves to Step-70.

When the selection mode is not the free mode or is a fixed mode (second selection mode), the selection mode setter 140 moves to Step-40 and determines whether the channel for which the link has been established is the channel set by the fixed mode (or fixed channel). The fixed mode is a selection mode in which the selection mode setter 140 selects a predetermined channel (specific communicator) in selecting one of the HDBaseT and Ethernet set channels.

When the channel for which the link has been established is a fixed channel, the selection mode setter 140 moves to Step-70. On the other hand, the channel for which the link has been established is a channel (non-set channel) different from the fixed channel, the selection mode setter 140 moves to Step-50 for display a warning on the display and operation apparatus 300 so as to enable the user to confirm whether the set channel is to be changed. At this time, the display and operation apparatus 300 may display information of the link establishment in the channel different from the fixed channel for warning purposes. When the user operates the display and operation apparatus 300 so as to change the set channel, the selection mode setter 140 changes the non-set channel to a new set channel in Step-60. Thereafter, the selection mode setter 140 moves to Step-70.

In Step-70, the selection mode setter 140 determines a set channel selected by the LAN signal switcher 50 and the LAN signal transmitter/receiver 110. For example, in case of the free mode in Step-30, the channel for the link has previously been established may be determined as the set channel. The priority of Ethernet and HDBaseT may be previously set, and the set channel may be determined in accordance with the priority once the link is established. In Step-80, the selection mode setter 140 confirms whether or not the set channel is the Ethernet channel. When the set channel is not the Ethernet channel but the HDBaseT channel, the selection mode setter 140 moves to Step-100.

In Step-100, the selection mode setter 140 confirms whether there is a network connection to the HDBaseT side, based on the signal from the HDBaseT confirmer 34 (or whether HDBaseT contains the LAN mode). When confirming the network connection to the HDBaseT side, the selection mode setter 140 moves to Step-110. In Step-110, the selection mode setter 140 disconnects the network for the operation mode of the Ethernet setter 46 (or the receiver 40), and stops the Ethernet network connection function.

On the other hand, when the set channel is the Ethernet channel in Step-80, the selection mode setter 140 moves to Step-90. In Step-90, the selection mode setter 140 stops (prohibits) the network connection on the HDBaseT side by setting the operation mode of the HDBaseT side setter 36 (or the receiver 30) to the network disconnection. However, connection(s) of the signal of one or more standards containing at least HDMI (non-network signal other than the first network signal) is valid.

When the operation mode is determined for the set channel used for the communication connection, the selection mode setter 140 starts a communication in Step-120. Thereafter, a steady monitoring state is set, and the selection mode setter 140 confirms whether the link has been disconnected in Step-130. When the link has been disconnected, at least one of the setting of the HDBaseT setter 36 and the setting of the Ethernet setter 46 is returned to an initial state so as to operate the network connection function in Step-140. Turning back to Step-10, the reception is confirmed, and the above process follows when the link is established in Step-20.

Thus, when the selection mode of the selection mode setter 140 is set to the free mode and the link is confirmed after the HDBaseT or Ethernet channel is connected to the LAN cable, the selection mode setter 140 selects the channel and starts the communication. Hence, even when the channel is not preset in the free mode, the communication can surely start with the channel connected to the LAN cable.

On the other hand, when the selection mode of the selection mode setter 140 is the fixed mode, the set channel is preset, and the link of the non-set channel is confirmed, the user confirms whether the set channel is to be changed. Thus, even when the user erroneously connects the non-set channel to the LAN cable, the set channel can be changed in accordance with the desire of the user and the communication can be started.

Whichever the selection mode is among the free mode or the fixed mode, the selection mode setter 140 monitors the link state after the link is established and the communication starts. When the link is disconnected, the settings of the HDBaseT and Ethernet channels are returned to the initial states. Thus, when the link is again established, the selection mode setter 140 can start a communication in accordance with the selection mode.

According to this embodiment, the projector 500 having a plurality of receivers 30 and 40 connectable to the network can confirm communication connections of the receivers 30 and 40 when the power is projected or in the steady operation state, etc., set a proper operation mode, and start a communication.

Second Embodiment

Figure 4:
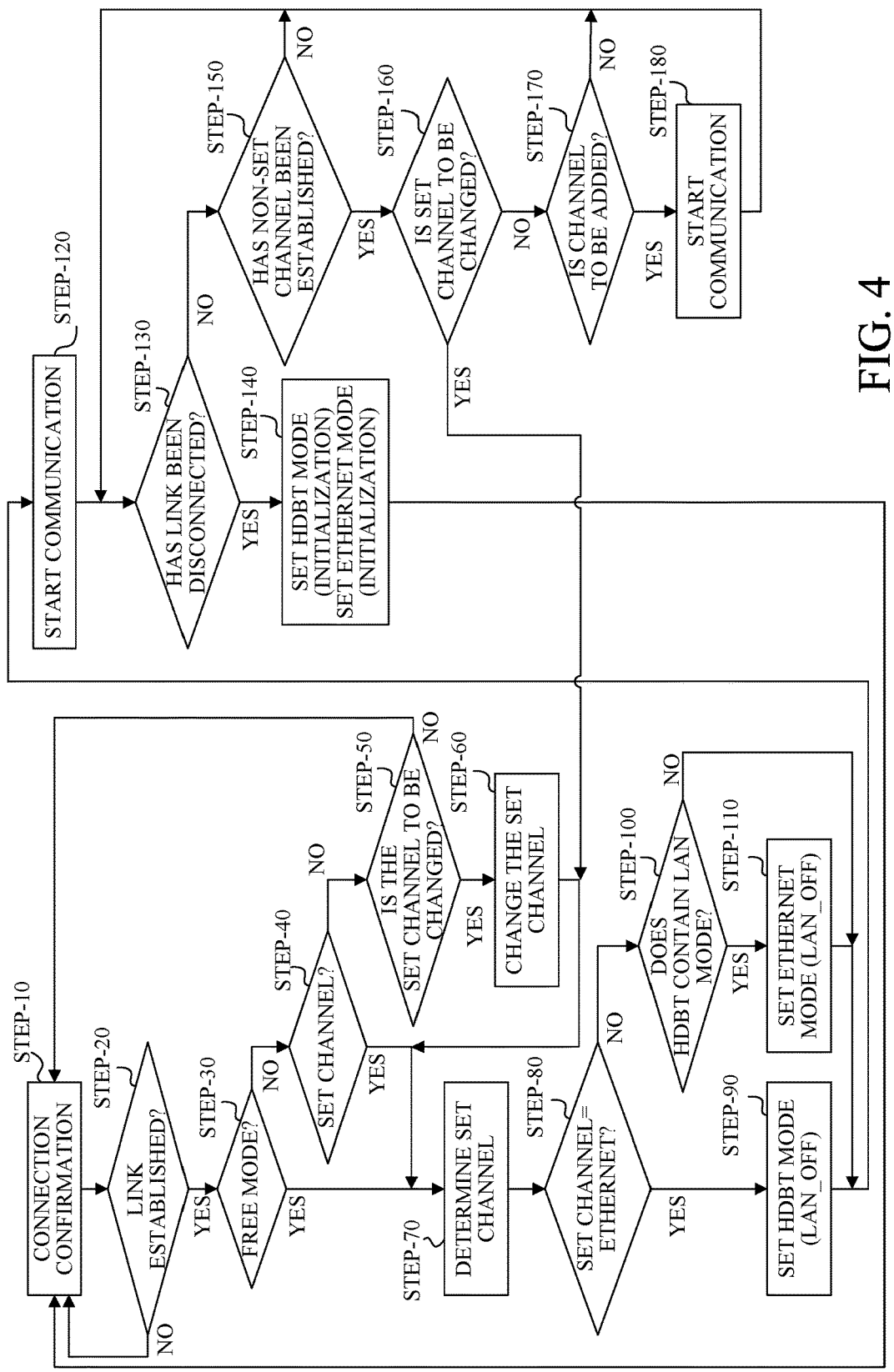
FIG. 4 is a flowchart for explaining processing according to a second embodiment of the present invention.

FIG. 4 illustrates a flowchart for explaining a variation of the processing illustrated in FIG. 3 according to a second embodiment of the present invention. Those steps in FIG. 4, which are corresponding steps in FIG. 3, will be designated by the same reference numerals, and a detailed description thereof will be omitted. The flowchart illustrated in FIG. 4 is made by adding Steps-150, 160, 170, and 180 to the flowchart illustrated in FIG. 3. The selection mode setter 140 that includes the computer or part of the computer may execute this processing in accordance with a communication control program as a computer program.

The selection mode setter 140 determines that the link has not yet been disconnected in Step-130 after the communication starts in Step-120 moves to Step-150, and confirms whether the link is established for the non-set channel.

When the non-set channel link is established, the selection mode setter 140 moves to Step-160 and confirms whether the user would like to change the set channel through the display and operation apparatus 300 similar to Step-50. At this time, as described in Step-50, the display and operation apparatus 300 may display the warning. When the set channel is to be changed, the selection mode setter 140 moves to Step-70. On the other hand, when the set channel is not to be changed, the selection mode setter 140 moves to Step-170, and the user confirms whether the new channel is to be added through the display and operation apparatus 300. When it is to be added, the selection mode setter 140 moves to Step-180 and starts the communication with the added channel.

A description will now be given of the operation mode in the HDBaseT receiver 30 with reference to the flowchart in FIG. 4. As described above, HDBaseT may provide a communication based on 100 BASE-TX, HDMI, and another standard. The operation mode of the receiver 30 may be set by the HDBaseT setter 36, and the actual link (connection) can be confirmed by the signal from the HDBaseT confirmer 34. The operation mode of the HDBaseT receiver 30 can be classified into (1) an operation mode corresponding to a signal based on a plurality of standards containing the LAN, (2) an operation mode corresponding only to the LAN, and (3) an operation mode corresponding to a signal based on one or more standards containing at least the HDMI (or the non-network signal other than the first network signal) without the LAN.

The HDBaseT operation mode corresponds to (1) and (2) as an exclusive relationship with the LAN connection using the Ethernet, and simultaneous communications using the Ethernet and the HDBaseT are available in (3).

Herein, a description will be given of the channel addition in Steps-170 and 180. For example, when the set channel is confirmed as Ethernet in Step-80, the HDBaseT setter 36 sets the operation mode (3) that does not contain the LAN in Step-90. Thereafter, the HDBaseT link is established with the non-set channel for the LAN in Step-150, and the flow moves to Step-180 when the channel is added to a non-LAN in Step-170 without changing the set channel with the LAN in step-160. In Step-180, the LAN is connected based on the Ethernet, and a communication corresponding to the non-network signal is newly added based on the HDBaseT.

On the other hand, when the LAN is not contained on the HDBaseT side in Step-100, the operation mode (3) is set so as to provide the LAN connection with the Ethernet channel. The Ethernet link is established as the non-set channel in Step-150, the set channel is not to be changed in Step-160, and the LAN is connected with the Ethernet channel in Step-180 when the channel is to be added in Step-170.

FIG. 5 illustrates a relationship among the set channel, the non-set channel, and the operation mode. The operation mode in the non-set channel contains an operation mode when the non-set channel is added in Steps-170 and 180 in FIG. 4. Ethernet, HDBaseT (containing the LAN) and HDBaseT (not containing the LAN) at the top (on the first column) represent communications for which the link is initially established. Ethernet and HDBaseT at the first (leftmost) row represent the set and non-set channels. The second to fourth rows from the left represent operation modes for the set channel and the added non-set channel with ○ (LAN connection or mode containing the LAN), Δ (mode not containing the LAN), and x (stop).

The second row from the left side represents the operation mode in which the Ethernet link is established, the set channel is the Ethernet channel, and the added non-set channel is the HDBaseT channel. In this case, the LAN connection based on the Ethernet is available (○), and the communication on the HDBaseT side is available with the operation mode (3) (Δ).

The third row from the left side represents the operation mode in which the HDBaseT link (containing the LAN) is established, the set channel is HDBaseT, and the non-set channel is the Ethernet channel. In this case, the LAN connection based on the HDBaseT (containing the LAN) is available (○) and the communication based on the Ethernet stops (x).

The fourth row from the left side represents the operation mode in which the HDBaseT (not containing the LAN) link is established, the set channel is the HDBaseT channel, and the added non-set channel is the Ethernet channel. In this case, the communication with the operation mode (3) is available on the HDBaseT side (Δ) and the LAN connection based on the Ethernet is available (○).

Each of the second row Δ and the fourth row ○ which are labelled by thick letters in FIG. 5 becomes x when only the set channel is valid. In particular, when the fourth row ○ becomes x, the Ethernet communication in the non-set channel stops when the HDBaseT (not containing the LAN) link is connected, and the LAN connection becomes unavailable. On the other hand, this embodiment confirms the operation mode of the set channel, sets a proper operation mode to the non-set channel, confirms a communication link state, and starts the communication when the link is established. Thereby, the proper operation mode can be set to each of the Ethernet and HDBaseT links, and the LAN connection becomes available.

Third Embodiment

Next follows a description of a third embodiment of the present invention. This embodiment discusses the HDBaseT device 600 as an external unit illustrated in FIG. 1 having the unillustrated confirmer (referred to as a transmitter/receiver hereinafter), similar to the receiver 30 having the confirmer 34.

The transmission confirms a connection of the projector 500 when the signals of a plurality of standards to which HDBaseT is applicable are communicated. For example, when the HDBaseT device 600 is connected to the RJ 45 connector 20 in the projector 500 through the LAN cable 660, the HDBaseT device 600 confirms the connection with the projector 500 as the Ethernet device. Then, the 100 BASE-TX communication starts. At this time, the transmission confirmer confirms the Ethernet link, and sends the link state to the projector 500 through the 100 BASE-TX communication. The selection mode selector 140 in the projector 500 performs the 100 BASE-TX communication, and confirms the LAN (Ethernet) link in the HDBaseT device 600 based on the HDBaseT and Ethernet confirmers 33 and 34. In this case, the link between the Ethernet confirmer 44 and the transmission confirmer is confirmed. Thereby, the selection mode selector 140 can confirm the connection between the HDBaset device 600 and the projector 500 through the LAN cable 660, and displays the LAN connection on the display and operation apparatus 300 through the communicator 150.

In this case, the LAN communication is normally performed, but when this is an undesired connection for the user, the user may disconnect the LAN cable 660 and connects it as the LAN cable 650 or 750.

When the Ethernet device 700 is connected to the projector 500 through the LAN cable 760, the HDBaseT confirmer 34 confirms the LAN link, and the LAN communication is performed when the communication start is selected. The selection mode setter 140 displays the LAN connection on the display and operation apparatus 300 through the communicator 150.

In this case, the LAN communication is normally performed, but if this is an undesired connection for the user or if the user desires a connection containing the HDMI standard etc. through the HDBaseT device 600, the HDBaseT confirmer 34 outputs a link confirmation containing the HDMI, and the misconnection is recognized. Then, the user disconnects the LAN cable 760 and connects the LAN cable 650 for the desired connection.

Thus, this embodiment confirms the LAN connection using the transmission confirmer in the HDBaseT device 600 and the HDBaseT and Ethernet confirmers 33 and 34, and displays the result on the display and operation apparatus 300. Thereby, the user can confirm the LAN cable connection to each of the HDBaseT and Ethernet devices, and prevent the misconnection of the LAN cable.

Fourth Embodiment

Figure 6:
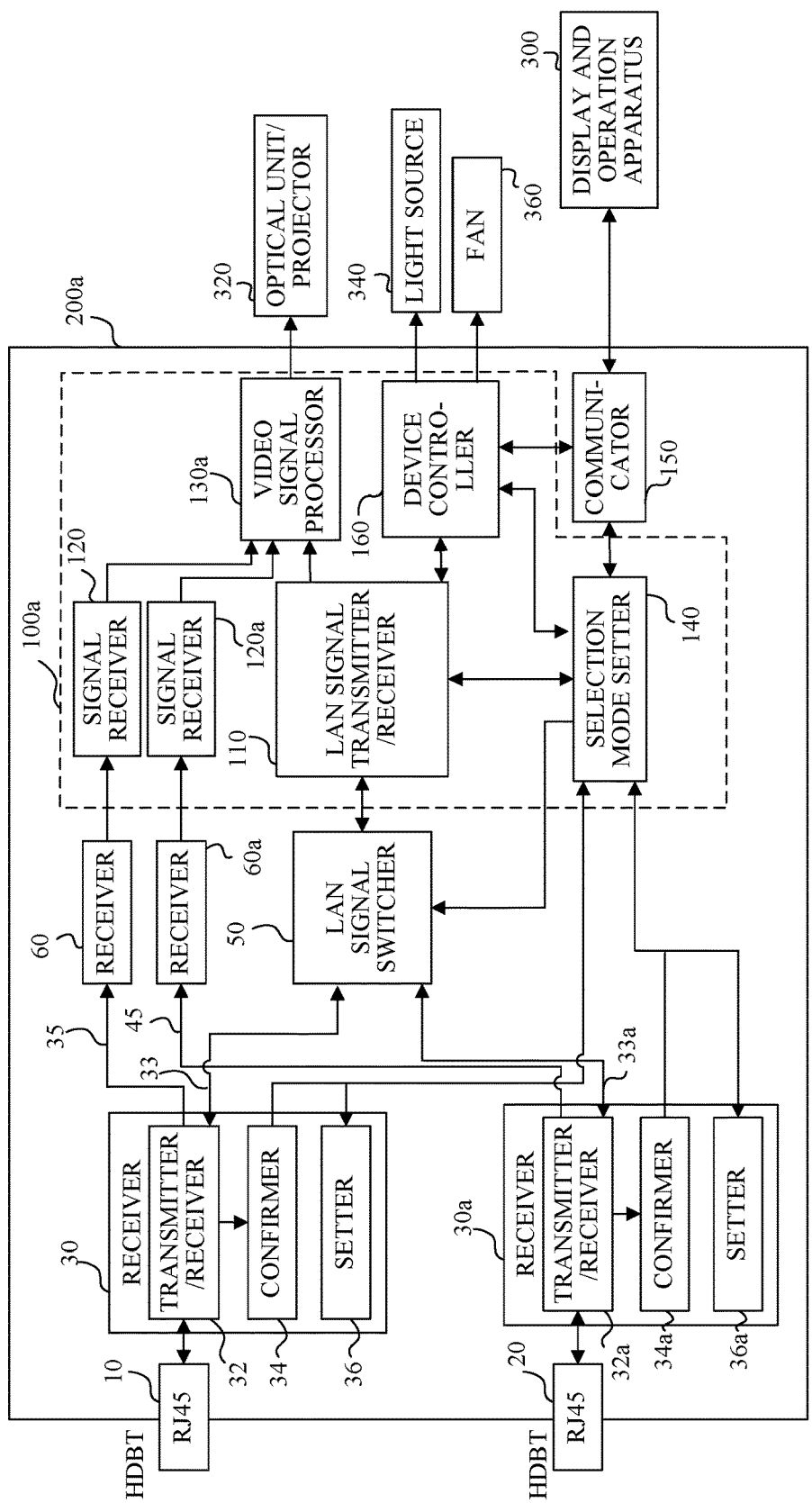
FIG. 6 is a block diagram illustrating a configuration of a projector according to a third embodiment of the present invention.

FIG. 6 illustrates a configuration of a signal processor 200a according to a fourth embodiment of the present invention. Those elements, which are corresponding elements in the first embodiment (FIG. 2), will be designated by the same reference numerals, and a detailed description thereof will be omitted.

This embodiment is different from the first embodiment in that the receiver connected to the RJ 45 connector 20 (which is the Ethernet receiver 40 in the first embodiment) is the HDBaseT receiver 30a in this embodiment.

The receiver 30a includes a transmitter/receiver 32a configured to provide data transmission and reception in the standard of 100 BASE-TX, HDMI, etc., and a confirmer (second confirmer) 34a configured to confirm a connection (or connection status) with the signals of a plurality of standards. The receiver 30a includes a setter (second operation setter) 36a configured to set a plurality of communication operations.

The signal from the transmitter/receiver 32a includes a network transmitted and received signal based on the 100 BASE-TX (second network signal) 33a, an HDMI signal 45, and another unillustrated communication signal. The HDMI signal 45 includes a high-speed difference signal and a low-speed difference signal, and is decoded by the receiver 60a, converted into a video signal, a synchronizing signal, a clock signal, an audio signal, etc., and finally input into the signal receiver 120a. The signals from the LAN signal transmitter/receiver 110, the signal receiver 120a, and the signal receiver 120 are input to the video signal processor 130a, receive video signal processing, a variety of corrections, etc., are input to the optical unit/projection unit 320, and are projected as the projected image.

In the signal processor 200a having this function, each function may include a discrete component, or part enclosed by a broken line 100a may include an integrated device, such as ASIC and FPGA.

FIG. 7 illustrates a relationship among the set channel, the non-set channel, and the operation mode. The operation mode of the non-set channel contains an operation mode when the non-set channel is added. In FIG. 7, HDBaseT connected to the receiver 30 is labelled as HDBaseT-1, and HDBaseT connected to the receiver 30a is labelled as HDBaseT-2.

HDBaseT-1 (containing the LAN), HDBaseT-1 (not containing the LAN), HDBaseT-2 (containing the LAN), and HDBaseT-2 (without LAN) illustrated on the top stage (first column) represent communications for which the link is initially established. HDBaseT-1 and HDBaseT-2 on the first (leftmost) row represent the set and non-set channels. The second to fifth rows from the left represent operation modes for the set and non-set channels with ○ (LAN connection or mode containing the LAN) and Δ (mode not containing the LAN).

The second row from the left illustrates the operation mode in which the HDBaseT-1 (containing the LAN) link is established, the set channel is the HDBaseT-1 channel, and the added non-set channel is the HDBaseT-2 channel. In this case, the LAN connection based on the HDBaseT-1 is available (○), and the communication is available on the HDBaseT-2 side with the operation mode (3) described in the second embodiment (Δ).

The third row from the left illustrates the operation mode in which the HDBaseT-1 (not containing the LAN) link is established, the set channel is the HDBaseT-1 channel, and the added non-set channel is HDBaseT-2.

In this case, the LAN connection is available on the HDBaseT-1 side with the operation mode (3) (Δ), and the second LAN connection based on the HDBaseT is available (○).

The fourth row from the left illustrates the operation mode in which the HDBaseT-2 (containing the LAN) link is established, the set channel is the HDBaseT-2, and the added non-set channel is the HDBaseT-1 channel. In this case, the LAN connection is available based on the HDBaseT-2 (○), and the communication is available on the HDBaseT-1 side with the operation mode (3) (Δ).

The fifth row from the left illustrates the operation mode in which the HDBaseT-2 (not containing the LAN) link is established, the set channel is the HDBaseT-2 channel, and the added non-set channel is HDBaseT-1. In this case, the LAN connection is available based on the HDBaseT-2 (○), and the LAN connection is available on the HDBaseT-1 side with the operation mode (3) (Δ).

Each of Δ illustrated by a thick character at the second and fourth rows and ○ illustrated by a thick character at the third and fifth rows in FIG. 7 becomes x when only the set channel is valid. In particular, when ○ at the third and fifth rows becomes x, the communication in the non-set channel stops and the LAN connection is unavailable when the HDBaseT-1 (not containing the LAN) or HDBaseT-1 channel is connected. On the other hand, this embodiment confirms the operation mode in the set channel, sets a proper operation mode for the non-set channel, confirms the communication link status, and starts a communication after the link is established. This configuration can set a proper operation mode to a plurality of HDBaseT channels for communications, and provide the LAN connection.

Each of the above embodiments can confirm signal connections to the receivers 30 and 40 (or 30a) connectable to the network, set a proper operation mode to each receiver in accordance with the confirmation result, and start a communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-239846, filed Dec. 9, 2015, which is hereby incorporated by reference herein in its entirety.

What is claimed is:

1. A communication apparatus comprising:
   a first communicator configured to receive a first signal obtained by multiplexing a plurality of signals having a plurality of standards which are different from each other, and demultiplex a first network signal which is transmittable to and receivable from a network and which is included in the first signal;
   a second communicator configured to receive a second network signal transmittable to and receivable from the network;
   a selector configured to select one network signal from the first or second network signals; and
   a controller,
   wherein the first communicator includes a first confirmer configured to confirm a reception of the first network signal,
   wherein the second communicator includes a second confirmer configured to confirm a reception of the second network signal, and
   wherein the controller is configured to:
      set at least one of a first selection mode for causing the selector to select one of the first or second network signals as a selected network signal or a second selection mode for causing the selector to select a preset network signal between the first and second network signals as the selected network signal;

in a case where the first selection mode is set, perform communication of the selected network signal whose reception is first confirmed between the first and second network signals by the first or second confirmer;

in a case where the second selection mode is set and a reception of the preset network signal is confirmed by the first or second confirmer, perform communication of the preset network signal; and in a case where the second selection mode is set and the reception of the preset network signal is not confirmed, perform a receiving operation for receiving an instruction indicating whether the preset network signal is to be changed or a warning operation.

2. The communication apparatus according to claim 1, wherein:

the first signal includes a non-network signal other than the first network signal; and the controller is configured to, when causing the selector to select the second network signal from the second communicator, allow the first communicator to receive and transmit the non-network signal.

3. The communication apparatus according to claim 1, wherein the controller is configured to, when causing the selector to select the first network signal from the first communicator, cause the second communicator to stop receiving and transmitting the second network signal.

4. The communication apparatus according to claim 1, wherein the first communicator is a communicator for use with HDBaseT, and the second communicator is a communicator for use with Ethernet.

5. The communication apparatus according to claim 1, wherein:

the second communicator is configured to receive a second signal obtained by multiplexing a plurality of signals having a plurality of standards which are different from each other, and demultiplex the second network signal included in the second signal; and the second confirmer is configured to confirm a reception of the second network signal included in the second signal.

6. The communication apparatus according to claim 5, wherein each of the first and second communicators is a communicator for use with HDBaseT.

7. The communication apparatus according to claim 1, wherein:

the first signal includes a non-network signal other than the first network signal; and the controller is configured to, where additionally performing communication through the first communicator after causing the selector to select the second network signal from the second communicator in the first selection mode, allow the first communicator to receive and transmit the non-network signal.

8. The communication apparatus according to claim 1, wherein:

the first signal includes a non-network signal other than the first network signal; and the controller is configured to, when the reception of the first network signal is not confirmed by the first confirmer after causing the selector to select the one network signal from the first communicator in the first selection mode, allow the first communicator to receive and transmit the non-network signal and cause the selector to select the second network signal as the one network signal.

9. The communication apparatus according to claim 1, further comprising a third communicator configured to transmit information of an operation by an operation unit configured to select the selection mode for the selector.

10. The communication apparatus according to claim 1, wherein the controller is configured to, when the reception of the selected network signal is not confirmed after the communication of the selected network signal selected by the selector is performed, return a state of at least one of the first and second communicators to an initial state.

11. The communication apparatus according to claim 1, wherein an external device connected to the first communicator serves to confirm the reception of the plurality of signals, and the controller is configured to cause a display unit to display information corresponding to a reception confirmation result by the external device and confirmation results by the first and second confirmers.

12. An image display apparatus comprising a communication apparatus and a display unit, wherein the communication apparatus includes:

a first communicator configured to receive a first signal obtained by multiplexing a plurality of signals having a plurality of standards which are different from each other, and demultiplex a first network signal which is transmittable to and receivable from a network and which is included in the first signal;

a second communicator configured to receive a second network signal transmittable to and receivable from the network;

a selector configured to select one network signal from the first or second network signals; and a controller, wherein the first communicator includes a first confirmer configured to confirm a reception of the first network signal, wherein the second communicator includes a second confirmer configured to confirm a reception of the second network signal, and wherein the controller is configured to:

set at least one of a first selection mode for causing the selector to select one of the first or second network signals as a selected network signal or a second selection mode for causing the selector to select a preset network signal between the first and second network signals as the selected network signal;

in a case where the first selection mode is set, perform communication of the selected network signal whose reception is first confirmed between the first and second network signals by the first or second confirmer;

in a case where the second selection mode is set and a reception of the preset network signal is confirmed by the first or second confirmer, perform communication of the preset network signal; and in a case where the second selection mode is set and the reception of the preset network signal is not confirmed, perform a receiving operation for receiving an instruction indicating whether the preset network signal is to be changed or a warning operation, and wherein the display unit displays an image corresponding to the one of the network signals received by the communication apparatus.

13. A non-transitory computer-readable storage medium configured to store a communication control program configured to enable a computer in a communication apparatus that includes a first communicator configured to receive a first signal obtained by multiplexing a plurality of signals having a plurality of standards which are different from each other, and demultiplex a first network signal which is transmittable to and receivable from a network and which is included in the first signal, and a second communicator configured to receive a second network signal transmittable to and receivable from the network, to select one network signal from the first or second network signals, the communication control program further enabling the computer to:
 confirm a reception of the first network signal; and
 confirm a reception of the second network signal,
 wherein the communication control program further enables the computer to:
  set at least one of a first selection mode to select one of the first or second network signals as a selected network signal or a second selection mode to select a preset network signal between the first and second network signals as the selected network signal;
  in a case where the first selection mode is set, perform communication of the selected network signal whose reception is first confirmed between the first and second network signals;
  in a case where the second selection mode is set and a reception of the preset network signal is confirmed, perform communication of the preset network signal; and
  in a case where the second selection mode is set and the reception of the preset network signal is not confirmed, perform a receiving operation for receiving an instruction indicating whether the preset network signal is to be changed or a warning operation.

14. A communication apparatus comprising:
 a first communicator configured to receive a first signal obtained by multiplexing a plurality of signals having a plurality of standards which are different from each other, and demultiplex a first network signal which is transmittable to and receivable from a network and which is included in the first signal;
 a second communicator configured to receive a second network signal transmittable to and receivable from the network;
 a selector configured to select one network signal from the first or second network signals; and
 a controller,
 wherein the first communicator includes a first confirmer configured to confirm a reception of the first network signal,
 wherein the second communicator includes a second confirmer configured to confirm a reception of the second network signal, and
 wherein the controller
 causes the selector to select a preset network signal between the first and second network signals as a selected network signal,
 performs, in a case where the first confirmer or the second confirmer confirms a reception of the preset network signal, a communication of the preset network signal, and
 performs, in a case where the first confirmer or the second confirmer do not confirm a reception of the preset network signal, a receiving operation for receiving an instruction indicating whether the preset network signal is to be changed, or a warning operation.

15. The communication apparatus according to claim 14,
 wherein the first communicator is a communicator for use with HDBaseT and the second communicator is a communicator for use with Ethernet, and
 wherein the first and second network signals are a signal conforming to the Ethernet standard.

16. An image display apparatus comprising a communication apparatus and a display unit,
 wherein the communication apparatus includes:
  a first communicator configured to receive a first signal obtained by multiplexing a plurality of signals having a plurality of standards which are different from each other, and demultiplex a first network signal which is transmittable to and receivable from a network and which is included in the first signal;
  a second communicator configured to receive a second network signal transmittable to and receivable from the network;
  a selector configured to select one network signal from the first or second network signals; and
  a controller,
  wherein the first communicator includes a first confirmer configured to confirm a reception of the first network signal,
  wherein the second communicator includes a second confirmer configured to confirm a reception of the second network signal,
  wherein the controller causes the selector to select a selected network signal whose reception is initially confirmed between the first and second network signals by the first confirmer or the second confirmer and performs a communication of the selected network signal,
  wherein the first communicator is a communicator for use with HDBaseT and the second communicator is a communicator for use with Ethernet, and
  wherein the first and second network signals are signals conforming to the Ethernet standard.

* * * * *